United States Patent
Sawyer (10) Patent No.: US 6,692,320 B1
(45) Date of Patent: Feb. 17, 2004

(54) GEAR SELECTOR ACTUATION SYSTEM FOR A MARINE PROPULSION DEVICE

(75) Inventor: Kass W. Sawyer, Neenah, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/211,186

(22) Filed: Aug. 2, 2002

(51) Int. Cl.[7] .............................................. B60K 41/00
(52) U.S. Cl. ........................................ 440/86; 440/84
(58) Field of Search ................................ 440/1, 84, 86, 440/87; 74/469, 473.1, 473.15, 473.3, 480 B, 500.5, 502.4; 477/107, 165

(56) References Cited

U.S. PATENT DOCUMENTS

| | | | |
|---|---|---|---|
| 2,702,615 A | * 2/1955 | Morse ........................ 477/113 |
| 3,301,084 A | * 1/1967 | Boda .......................... 477/113 |
| 3,613,632 A | 10/1971 | Farrell |
| 3,943,878 A | * 3/1976 | Kirkwood et al. ............ 440/51 |
| 4,231,316 A | 11/1980 | Bland et al. |
| 4,294,133 A | * 10/1981 | Hurley ...................... 74/502.4 |
| 4,753,618 A | 6/1988 | Entringer |
| 4,766,776 A | * 8/1988 | Newman ................... 74/502.6 |
| 4,794,820 A | 1/1989 | Floeter |
| 4,838,822 A | * 6/1989 | Friedle et al. ................. 440/86 |
| 4,924,724 A | * 5/1990 | Yoshimura ............... 74/473.15 |
| 4,952,181 A | * 8/1990 | Entringer et al. ............. 440/86 |
| 5,050,461 A | * 9/1991 | Onoue et al. ................ 477/111 |
| 5,062,403 A | * 11/1991 | Breckenfeld et al. ........ 123/400 |
| 5,076,233 A | * 12/1991 | Nelson et al. .......... 123/406.74 |
| 5,207,116 A | 5/1993 | Sultze |
| 5,261,844 A | * 11/1993 | Shibata ......................... 440/87 |
| 5,280,282 A | * 1/1994 | Nagafusa et al. ............. 340/5.3 |
| 5,692,931 A | * 12/1997 | Kawai .......................... 440/86 |
| 5,910,191 A | * 6/1999 | Okamoto ................. 74/473.14 |
| 6,077,136 A | * 6/2000 | Arai et al. ..................... 440/86 |
| 6,238,255 B1 | * 5/2001 | Takase ........................... 440/1 |
| 6,416,367 B1 | * 7/2002 | Goebel .......................... 440/1 |

FOREIGN PATENT DOCUMENTS

| | | | | |
|---|---|---|---|---|
| EP | 0388227 A | * 9/1990 | .................. 440/86 |
| JP | 53020295 A | * 2/1978 | .......... B63H/21/22 |
| JP | 62128899 A | * 6/1987 | .......... B63H/21/26 |
| JP | 63137098 A | * 6/1988 | .......... B63H/23/08 |
| JP | 63312296 A | * 12/1988 | .......... B63H/21/22 |
| JP | 63315397 A | * 12/1988 | .......... B63H/21/26 |
| JP | 01052591 A | * 2/1989 | .......... B63H/21/28 |
| JP | 02006294 A | * 1/1990 | .......... B63H/21/22 |
| JP | 03279097 A | * 12/1991 | .......... B63H/21/26 |
| JP | 04038295 A | * 2/1992 | .......... B63H/21/26 |
| SU | 0531778 A | * 10/1976 | .................. 440/87 |
| SU | 0713769 A | * 2/1980 | .................. 440/86 |
| WO | WO 9104192 A1 | * 4/1991 | .................. 440/86 |

* cited by examiner

*Primary Examiner*—S. Joseph Morano
*Assistant Examiner*—Ajay Vasudeva
(74) *Attorney, Agent, or Firm*—William D. Lanyi (57) ABSTRACT

An actuation system for a gear selector of a marine propulsion device incorporates an adjustable motion directing component that changes the path of travel of an actuator end of a push-pull cable. This adjustable change creates a beneficial effect by changing the relative positions of a shift shaft and associated link arms in relation to positions of a wire within a sheath of a push-pull cable.

20 Claims, 6 Drawing Sheets

GEAR SELECTOR ACTUATION SYSTEM FOR A MARINE PROPULSION DEVICE

BACKGROUND OF THE INVENTION

1. Field of the Invention

The present invention is generally related to an actuation system and, more particularly, to a gear selector actuation device that is used to select forward, reverse, and neutral gear positions in conjunction with the marine propulsion system.

2. Description of the Prior Art

Push-pull cables are well known to those skilled in the art and used in many different applications to allow an operator to actuate a movement at a location which is spaced apart from the location of the operator. These types of devices are used to actuate brakes and gear selectors on motorcycles, snowmobiles, bicycles, and marine vessels. When used in conjunction with marine vessels, the push-pull cable can be used to actuate gear selector mechanisms and throttle position selectors.

U.S. Pat. No. 3,613,632, which issued to Farrell on Oct. 19, 1971, describes a combined steering, shift and throttle control for outboard, inboard, or inboard-outboard powered boats. The invention provides a single capstan lever which is pivoted upon the front of the boat for tilting movement to right or left and is connected through push-pull cables or similar devices to a steerable outboard rudder or to the outboard part of the inboard-outboard drive combination at the rear of the boat to effect steering control of the boat and the shift and throttle of the outboard motor part or rudder. This capstan lever has handles extending from the top thereof which can be grasped by the pilot to effect steering movement of the lever. The upper end of the capstan lever is flared and tightly receives the removable casings of throttle and shift levers that are connected through push-pull cables with the outboard or inboard motor. Various connections are made from the capstan lever to the outboard motor to effect the steering of the outboard motor, not only in the form of a push-pull cable, but rod linkage and telemetric hydraulic cylindrical device. An instrument panel may be provided upon the capstan where it can be easily viewed by the pilot.

U.S. Pat. No. 4,952,181, which issued to Entringer et al on Aug. 28, 1990, discloses a marine shift cable assembly with a spring guide. A shift cable assembly for a marine drive having a clutch and gear assembly includes a remote control for selectively positioning the clutch and gear assembly into forward, neutral, and reverse gear, a control cable connecting the remote control to a shift lever pivotally mounted on a shift plate, a drive cable connecting the shift lever on the shift plate to the clutch and gear assembly, and a spring guide assembly with compression rings biased to a loaded condition by movement of the remote control from neutral to forward and also biased to a load condition by movement of the remote control from neutral to reverse. The bias minimized chatter of the clutch and gear assembly upon shifting into gear, and aids shifting out of gear and minimized slow shifting out of gear and returns the remote control to neutral, all with minimum backlash of the cables. The spring guide assembly includes an outer tube mounted to the shift plate, and a spring biased plunger axially reciprocal in the outer tube and mounted at its outer end to the shift lever.

U.S. Pat. No. 5,207,116, which issued to Sultze on May 4, 1993, describes a cable core length adjuster mechanism. The mechanism provides adjustment for a push-pull cable system having a core disposed within a conduit. The core and the conduit are flexible for much of their length, with the core being a rigid rod at the ends. An end of one of the rods is slidably disposed within a body of the adjuster mechanism. The body has a generally rectangular shape, elongated in an axial direction. The body has a means of swivelable attachment integrated into it. The body has a rectangular opening through it which is perpendicular to the axis from a top to a bottom. There are teeth transverse to the axis in the opening on the sides paralleling the axis. A clip is disposed in the opening. The clip can be manually moved from an adjust position to an engaged position. It has teeth complementary to the teeth in the opening that engage those teeth when the clip is in an engaged position by pressing it into the body. When the clip is in the adjust position, the teeth are not engaged. In the adjust position, the clip is snapped over the rod end, axially engaging it in a circumferential groove of the rod end. A spring disposed between the body and the clip biases the body relative to the clip.

U.S. Pat. No. 6,077,136, which issued to Arai et al on Jun. 20, 2000, describes an outboard motor control. A shift and throttle control mechanism allows for control of the shift and throttle features of an outboard motor through two separate operators. For instance, one operator can be remotely positioned in the hull in an associated watercraft, while the other operator can be formed on a steering handle of the outboard motor. The shift and throttle control mechanism is also configured to fit within a cowling of the outboard motor, together with a four cycle engine, without significantly increasing the size of the cowling. In one mode, the shift and throttle control mechanism includes a shift shaft arranged toward the front side of the engine. One of the operators is directly connected to the shift shaft by a linkage rod. The other operator is connected by a shift control cable to a shift lever that is located on the side on the engine. This location of the lever allows the end of the shift control cable to be fixed within the cowling without increasing the cowling's size. A link connects the shift lever to the shift shaft, which in turn actuates a shift rod to control a transmission of the outboard motor.

U.S. Pat. No. 4,794,820, which issued to Floeter on Jan. 3, 1989, discloses a marine drive twin lever remote control with interlock override. A twin lever control actuator operates push-pull cables and has two sets of pulleys on opposite sides of a control body. Interlock structure normally prevents movement of the shift lever and its cable when the throttle lever and its cable are in a high speed position and with the operator applying normal force to the shift lever. Override structure permits movement of the shift lever and its cable with the throttle lever in a high speed position when the operator applies an abnormally high force to the shift lever to enable emergency high speed shifting including from forward to reverse, to facilitate rapid deceleration.

U.S. Pat. No. 4,753,618, which issued to Entringer on Jun. 28, 1988, discloses a shift cable assembly for a marine drive. The device includes a shift plate, a shift lever pivotally mounted on the plate, and a switch actuating arm pivotally mounted on the plate between a first neutral and a second switch actuating position. A control cable and drive cable interconnect the shift lever and switching actuating arm with a remote control and clutch and gear assembly for the marine drive so that shifting of the remote control by a boat operator moves the cables to pivot the shift lever and switch actuating arm which in turn actuates a shift interrupter switch mounted on the plate to momentarily interrupt ignition of the drive unit to permit easily shifting into forward, neutral, and reverse gears. A spring biases the arm into its neutral position and the arm includes an improved mounting for retaining the spring in its proper location on the arm.

U.S. Pat. No. 4,231,316, which issued to Bland et al on Nov. 4, 1980, describes an actuation means for a marine propulsion device transmission. The device includes a shiftable, reversing transmission located in a propulsion unit and connecting a driveshaft to a propeller shaft and a shifting mechanism including an actuation member connected to the transmission. Movement of the actuating member to shift the transmission between a neutral condition and forward drive and reverse drive conditions is effected by a shifting system including a flexible dual cable conduit assembly connected between the actuating member and a shift lever mounted for reciprocal movement. The opposite ends of the two shift cables are linked together in a manner such that the movement of the shift lever in opposite directions causes alternate pulling of the shift cables to shift the transmission.

The patents described above are hereby expressly incorporated by reference in the description of the present invention.

In an actuation system that incorporates a push-pull cable, an inherent problem exists with regard to the movement of the internal wire within the external sheath, or casing, of the cable. Because of the requirement that clearance be provided between the outer surface of the wire and the inner surface of the casing, or sheath, the wire can bend within the internal cavity of the sheath. This can result in the loss of motion between the movement of the wire at a control end of the cable and the resulting movement of the wire at an actuation end of the cable. The principle elements of lost motion in a control system are backlash and deflection. Backlash is caused by the core member, or wire, moving inside the casing, or sheath, with the change in direction of motion. It is a function of the clearance between the core and casing and the total number of degrees of bend in the cable. The other loss of motion is deflection of the core wire under compressive load. Elastic strain in the core member due to compressive or tensile force also contributes to the loss of motion. Although this loss of motion can be reduced by careful design, they represent an inherent potential problem in applications where the precise degree of travel at the control end of the wire, or core, is important. These problems are significantly exacerbated as a function of the length of the push-pull cable, with longer cables exhibiting more significant loss of motion at the actuator end.

It would therefore be significantly beneficial if an actuation system could be provided in which an adjustment can be made at the actuation end of a push-pull cable system to select the range of travel of a device that is actuated by the actuation end of a push-pull cable.

SUMMARY OF THE INVENTION

An actuation system, made in accordance with the preferred embodiment of the present invention, comprises a push-pull cable having a control end and an actuation end, with the push-pull cable comprising a sheath with a wire disposed within the sheath. Throughout the description of the present invention, it should be understood that the sheath is a tubular casing and the wire is disposed within the internal cavity of the tubular casing. The present invention further comprises an actuator attached to the wire at the actuation end. A rotatable component is supported for rotation about a first axis and a link arm is connected between the rotatable component and the actuator. The link arm is attached to the rotatable component at a point which is spaced apart from the first axis. A motion directing component is associated with the actuator to determine the path of travel of the actuator in response to movement of the wire at the actuation end of the push-pull cable. The position of the motion directing component is adjustable relative to the rotatable component.

A preferred embodiment of the present invention further comprises an anchor member attached to the actuation end of the sheath. The anchor member is rotatable about a second axis. The motion directing component comprises a channel portion, in a particular preferred embodiment, and the actuator is disposed within the channel portion. The channel portion limits movement of the actuator to a restricted path in response to movement of the wire relative to the sheath at the actuation end of the push-pull cable. In a preferred embodiment, the restricted path is generally a straight line, but it should be understood that other shapes can be selected to achieve certain desired results. For example, a generally S-shaped or sinusoidal path could be provided so that the effect on the movement of the rotatable component is more symmetrical as a result of movement of the actuator in opposite directions from a central position.

A position retention mechanism, such as a screw, bolt, or pin, is provided to prevent movement of the motion directing component relative to the rotatable component except when the position of the motion directing component is being manually adjusted. The position retention mechanism comprises a protrusion on the position retention mechanism and a recess formed in a surface to which the position retention mechanism is attached. The recess is shaped to receive the protrusion and, in combination with the bolt, holds the motion directing component in a fixed position during operation.

The rotatable component is attached to a shift shaft of a marine propulsion system in a particularly preferred embodiment. Rotation of the rotatable component causes synchronous rotation of the shift shaft to result in a change of gear position between the forward, neutral, and reverse gear positions.

A manually controlled gear position selector is provided and connected to the control end of the push-pull cable, whereby movement of the manually controlled gear position selector causes the wire to move within the sheath.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment of the present invention, like components will be identified by like reference numerals.

Figure 1:
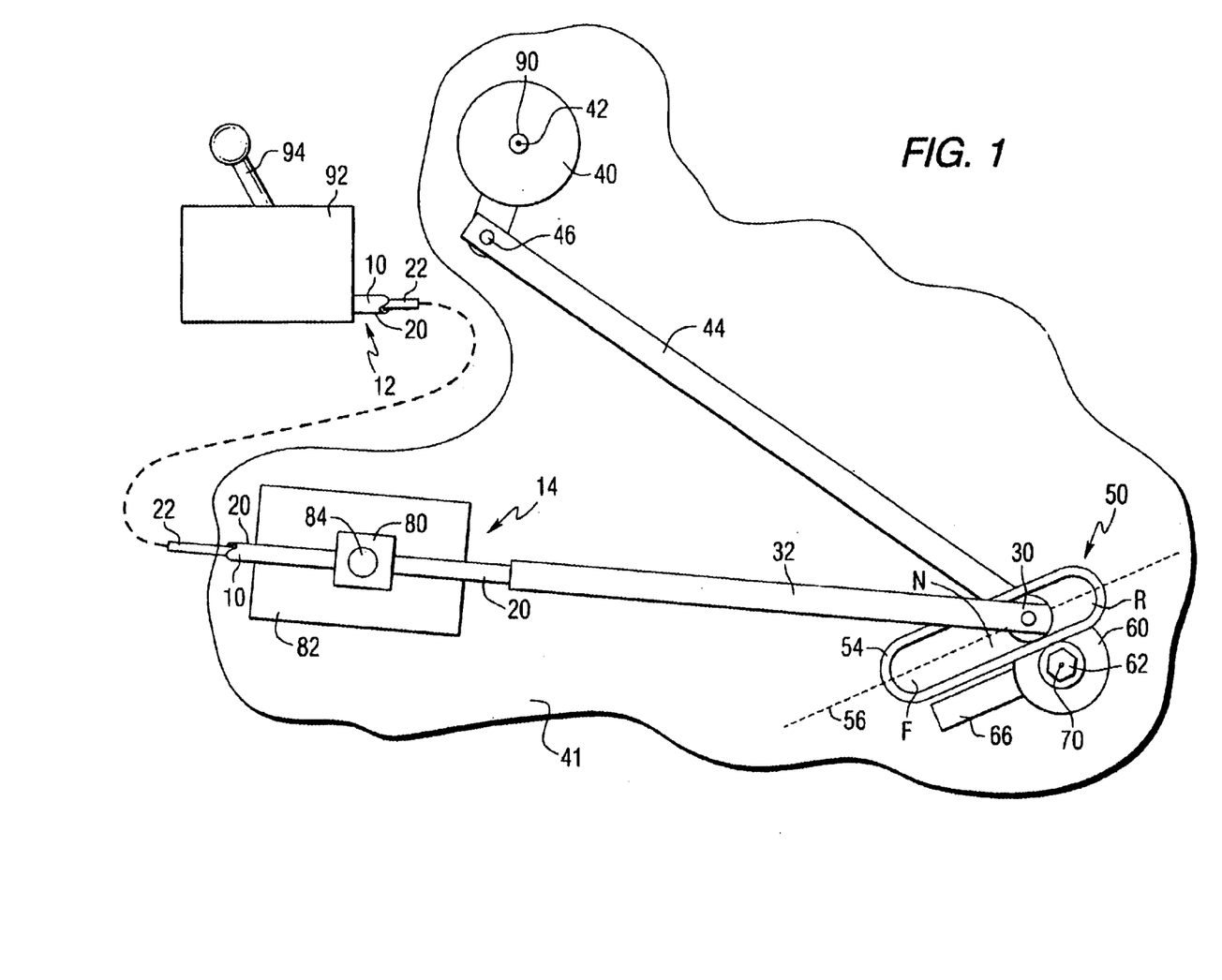
FIG. 1 is a schematic representation of the present invention.

FIG. 1 is a schematic representation of the present invention in a preferred embodiment which is associated with a marine propulsion system. A push-pull cable 10 has a control end 12 and an actuation end 14. The push-pull cable 10 comprises a sheath 20 and a wire 22 slidably disposed within the sheath. An actuator 30 is attached to the wire at the actuator end 14. In the embodiment shown in FIG. 1, the actuator 30 also comprises a tubular portion 32 that is slidable relative to the sheath 20 which is disposed within a cylindrical opening of the tubular portion 32. A rotatable component 40 is supported for rotation relative to surface 41 and about a first axis 42. A link arm 44 is connected between the rotatable component 40 and the actuator 30. The link arm 44 is attached to the rotatable component 40 at a point 46 which is spaced apart from the first axis 42. A motion directing component 50 is associated with the actuator 30 to direct and limit the path of travel of the actuator 30 in response to movement of the wire 22 within the sheath 20 at the actuator end 14 of the push-pull cable 10. The position of the motion directing component 50 is adjustable relative to the rotatable component 40.

With continued reference to FIG. 1, the motion directing component 50 comprises a channel portion 54 which determines the path 56 of the actuator 30 as it moves in response to movement of the wire 22 relative to the sheath 20 of the push-pull cable 10. The motion directing component 50 also comprises a position retention mechanism 60 which can, in turn, comprise a threaded member 62 that allows the motion directing component 50 to be rigidly attached to a surface of a marine propulsion system or other device associated with the actuation system. An extension 66 is attached to the position retention mechanism 60. Although not visible in FIG. 1, the extension 66 can comprise one or more protrusions extending downwardly toward the surface to which the motion directing component is attached. The one or more protrusions are raised ridges which are shaped to be received in one or more recesses 67 formed in that surface of the marine propulsion system. With the one or more protrusions disposed within the one or more recesses 67 in the surface 41 to which the position retention mechanism 60 is attached, the threaded member 62 can be tightened. This provides two fixed positions that prevent the motion directing component 50 from moving relative to the surface to which it is attached. If it is desirable to adjust the position of the path 56 relative to the position of the rotatable component 40, the threaded member 62 can be loosened and the one or more protrusions can be removed from their associated one or more recesses 67. When this is done, the motion directing component 50 can be rotated about the axis 70 of the threaded member 62 to change the relative position of the path 56 relative to the rotatable component 40. When the proper position of the path 56 is determined, the protrusions can be disposed within their associated recesses 67 and the threaded member 62 can be tightened to maintain the position of the path 56.

With continued reference to FIG. 1, the present invention also provides an anchor member 80 that is attached to the actuation end 14 of the sheath 20. In a preferred embodiment, the sheath 20 is inserted through a cylindrical opening of the anchor member 80 and the anchor member 80 is tightened to prevent subsequent movement of the sheath 20 relative to the anchor member. The anchor member 80 is supported by a suitable structure 82 and is rotatable about its own axis 84.

The motion directing component 50 comprises the channel portion 54. The actuator 30 is disposed within the channel portion 54, as illustrated in FIG. 1, so that the channel portion limits the actuator 30 to a restricted path 56 in response to movement of the wire 22 relative to the sheath 20. In other words, as the wire 22 moves within the sheath 20, in a direction from the control end 12 toward the actuation end 14, the actuator 30 and its attached tubular member 32 move away from the anchor member 80. This direction is generally toward the right in FIG. 1. The position of the channel portion 54 requires that the actuator 30 move along the path 56 which results in a movement by the actuator 30 in a direction toward the right and upward in FIG. 1.

In the preferred embodiment shown in FIG. 1, the restricted path 56 is generally straight because of the shape of the channel portion 54. However, in alternative embodiments of the present invention, nonlinear shapes of the path 56 are possible. Certain advantages can be achieved if the channel portion 54 is shaped to result in a path 56 which is generally sinusoidal. It should be understood that the precise shape of the path 56 is not limiting to the present invention.

In a preferred embodiment of the present invention, the rotatable component 40 is attached to a shift shaft 90 of a marine propulsion system. Shift shafts for marine propulsion systems are well known to those skilled in the art and several examples are illustrated and described in the U.S. patents described above and explicitly incorporated by reference herein. A manually controlled gear position selector 92, with a manually operable control handle 94, is connected to the control end 12 of the push-pull cable 10. As a result, movement of the handle 94 of the manually control gear position selector 92 causes the wire 22 to move within the sheath 20 and, as a result, causes the actuator 30 to move within the channel portion 54 of the motion directing component 50.

Figure 2:
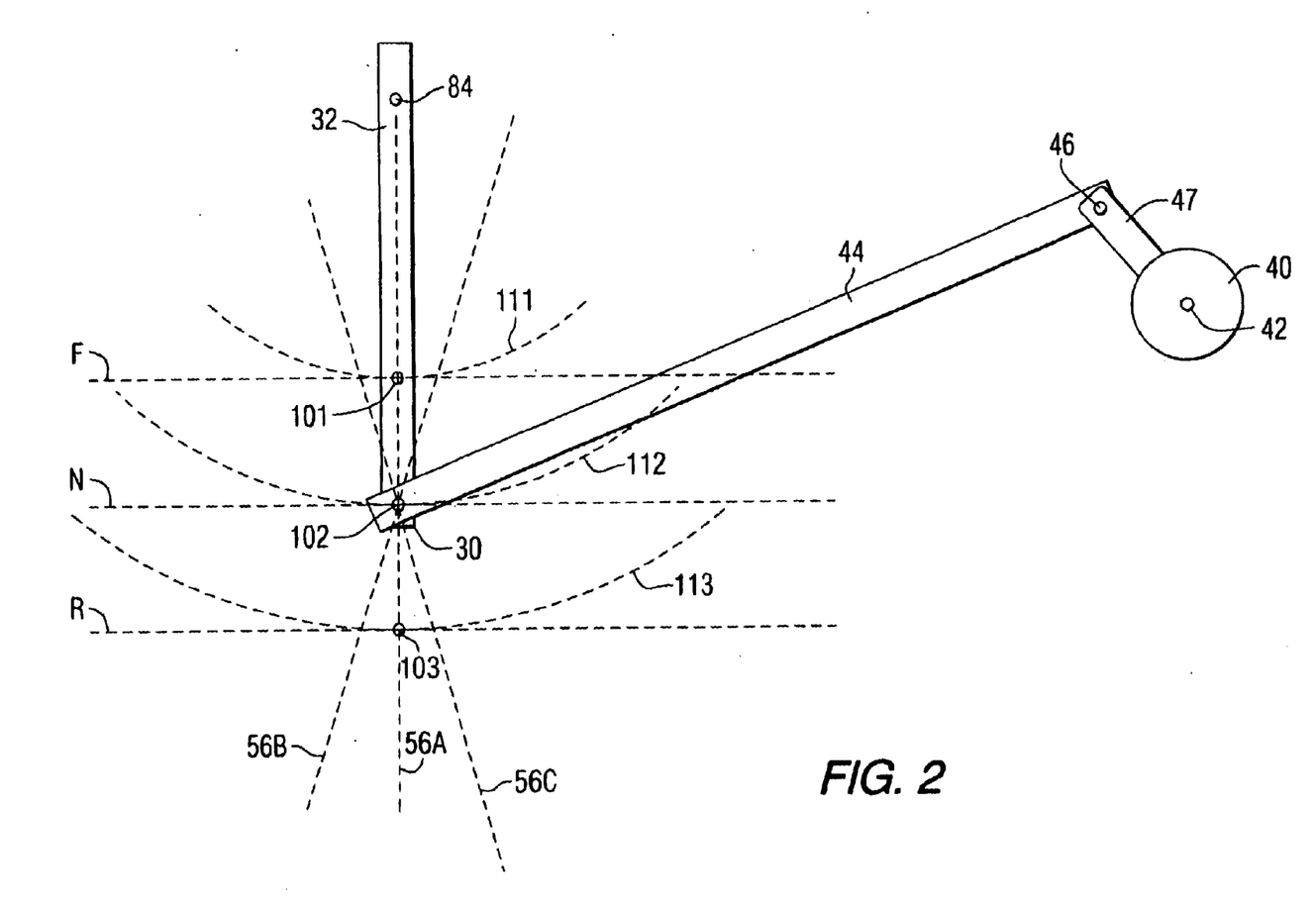
FIG. 2 is a graphical representation of the paths of motion of several components of the present invention.

FIG. 2 schematically illustrates some of the motions of the components described above. For simplicity, only the actuator 30, the tubular portion 32, the link arm 44, and the rotatable component 40 are shown in FIG. 2. Three positions are represented by horizontal dashed lines in FIG. 2. They represent the forward F, neutral N, and reverse R positions of the gear selector actuation system of a marine propulsion device. With the path 56 in the position represented by reference numeral 56A in FIG. 2, movement of the wire 22 within the sheath will cause the actuator 30 to move to one of the three positions, represented by points 101–103, which are associated with the actuator 30 being in the forward F, neutral N, or reverse R positions, respectively.

With continued reference to FIG. 2, dashed lines 56B and 56C show two other alternative positions of the path 56 that are determined by the position of the motion directing component 50, as described above. Curved dashed lines, 111–113, represent the arcuate paths along which the actuator 30 can travel if the sheath 20 and tubular member 32 rotate about axis 84 of the anchor member 80. It should be understood that the anchor member 80 is pivotable and is provided to allow movement of the actuator 30 in response to changes in position of the wire 22 within the sheath 20. The movement of the actuator 30 is described by the three dashed line arcs, 111–113, in FIG. 2.

Figure 3:
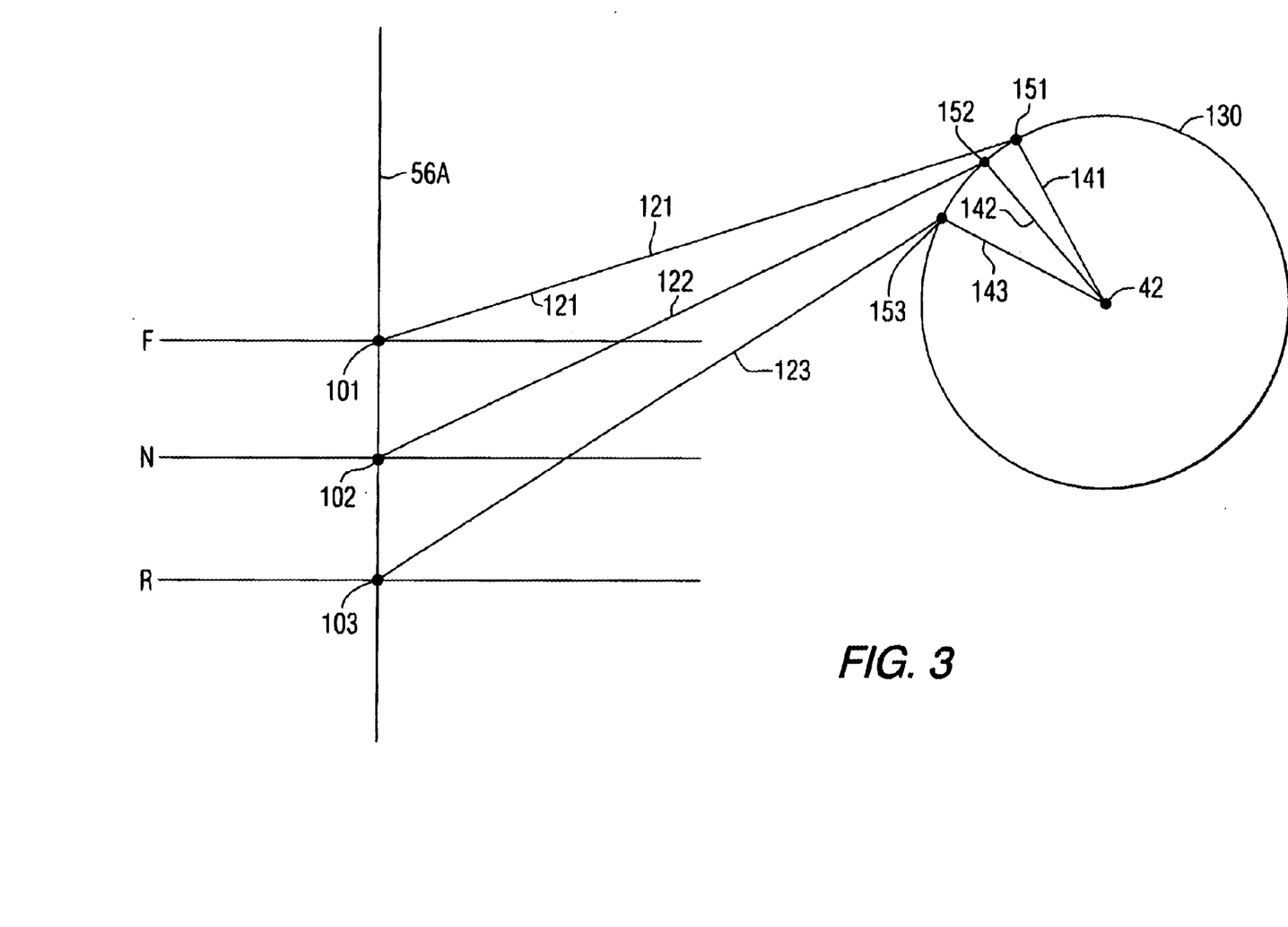
FIG. 3 is a graphical representation of the related movements of several linkage elements of the present invention.

FIG. 3 is a graphical representation of lines that represent the positions of the link arm 44 and radius arm 47 of the rotatable component 40 when the actuator 30 is moved between the three gear selection positions, forward F, neutral N, and reverse R. These positions of the link arm 44 are represented by lines 121–123, respectively. Circle 130 represents all of the possible positions of point 46 as the link arm 44 moves in response to movement of the actuator 30. Reference numerals 141–143 represent three positions of the arm 47 of the rotatable component 40 when the link arm 44 is in the three positions represented by reference numerals 121–123, respectively.

With continued reference to FIGS. 1–3, it may possibly be decided that one or more of the three positions, 151–153, of point 46 are not desirable with respect to the intended positions of the shift shaft with respect to the forward F, neutral N, is and reverse R positions. This could result from the use of a long push-pull cable 10 which exhibits a significant amount of lost motion in the movement of the wire 22 within the sheath. To correct this situation, the motion directing component 50 can be loosened by loosening the threaded member 62 and removing the associated protrusions on arm 66 from their associated recesses 67 in the surface 41. The motion directing component 50 can then be rotated about point 70 in FIG. 1 to allow the path 56 to be changed with respect to the rotatable component 40. One possible result of this rotation of the motion directing component 50 is illustrated in FIG. 4.

Figure 4:
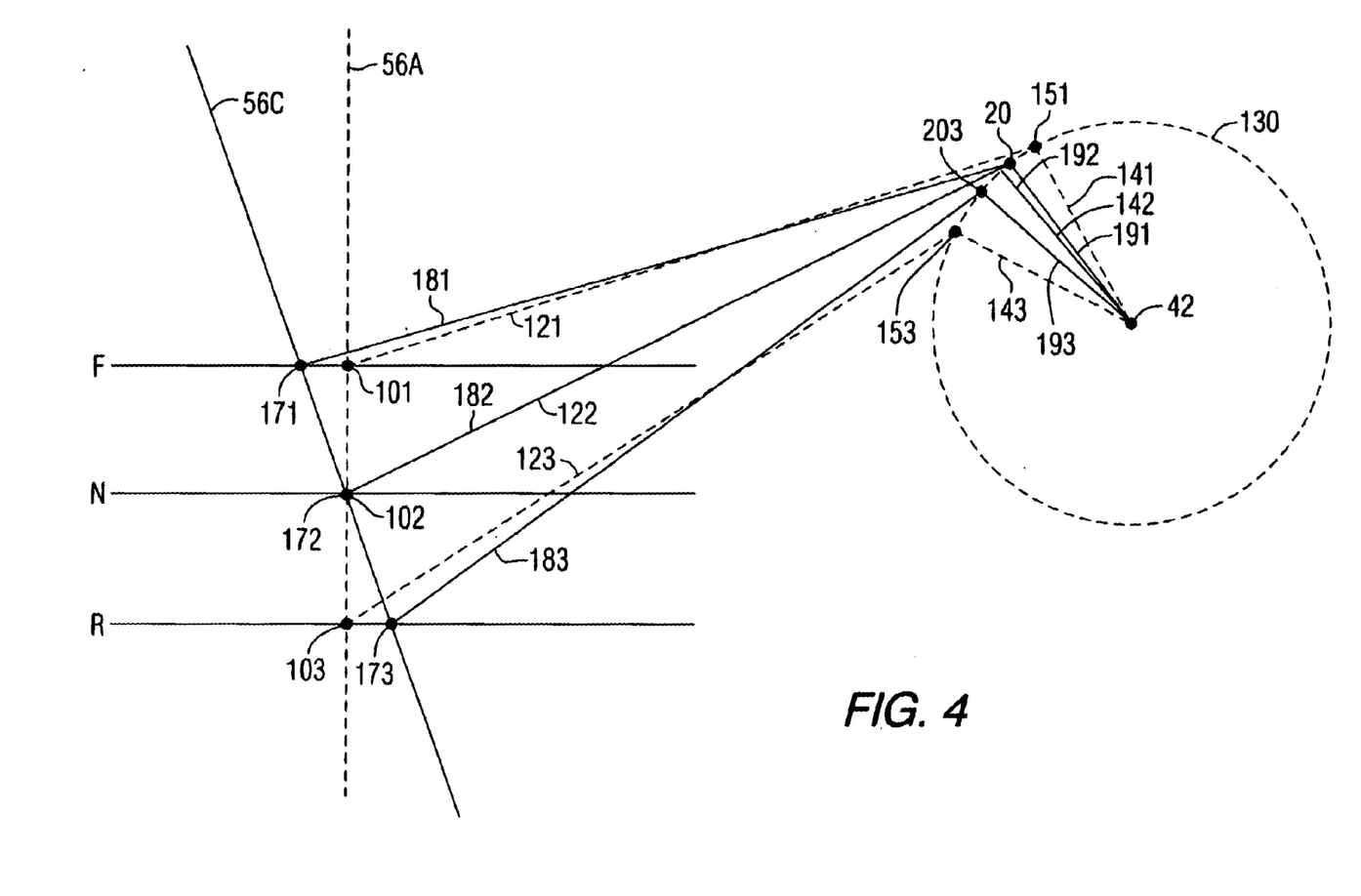
FIG. 4 shows an alternative position of the components illustrated in FIG. 3.

In FIG. 4, the lines represented in FIG. 3 are shown as dashed lines. The path 56A has been moved to the position of line 56C as a result of the rotation of the motion directing component 50 in FIG. 1. Movement of the wire 22 within the sheath 20 will now cause the actuator 30 to move along path 56C to one of the three illustrated points, 171–173, which represent the forward F, neutral N, and reverse R gear positions. It should be noted that the change in position between points 101–103 and 171–173, respectively, are shown on the horizontal solid lines in FIG. 4 representing the gear positions but, in reality, the movement actually would occur along arcuate paths such as those represented by dashed arcs 111–113 in FIG. 2. For purposes of clarity, the slight in vertical position of dots 171–173 in FIG. 4 is not shown. Although it is recognized that the arcuate paths represented by dashed lines 111–113 in FIG. 2 could make a measurable difference in the positions of points 171–173, that difference is very slight and not sufficient to adversely affect either the operation of the present invention or the manual adjustment of the position of the motion directing component 50 by an operator.

With continued reference to FIGS. 1–4, it can be seen that the link arm 44 now assumes the positions represented by lines 181–183 in response to movement of the actuator 30 to the forward, neutral, and reverse positions represented by points 171–173, respectively. For purposes of this illustration, it will be assumed that the adjustment of the motion directing component 50 was made in such a way that the neutral gear position 102 does not change and the new position 172 is coincident with it. As a result, lines 122 and 182 in FIG. 4 are in identical positions to each other. The positions of arm 47 are represented by lines 191–192 which are associated with link arm positions 181–183, respectively.

By moving the motion directing component 50 to select path 56C in stead of 56A, as represented in FIG. 4, the forward and reverse gear selection positions of point 46 in FIG. 1 are changed from positions 151 and 153 in FIG. 4 to positions represented by points 201 and 203. Naturally, it should be understood that the motion directing component 50 can be rotated about axis 70, illustrated in FIG. 1, either clockwise or counterclockwise relative to path 56A to achieve the desired positions of the forward and reverse gear selections. As a result, the gear selection positions of the rotatable component 40 can be determined independently of the potential lost motion experienced by the wire 22 within the sheath 20 of the push-pull cable 10. This is particularly important in situations where long push-pull cables 10 extend between a control end 12 and an actuation end 14, such as in conjunction with relatively large marine vessels.

Figure 5:
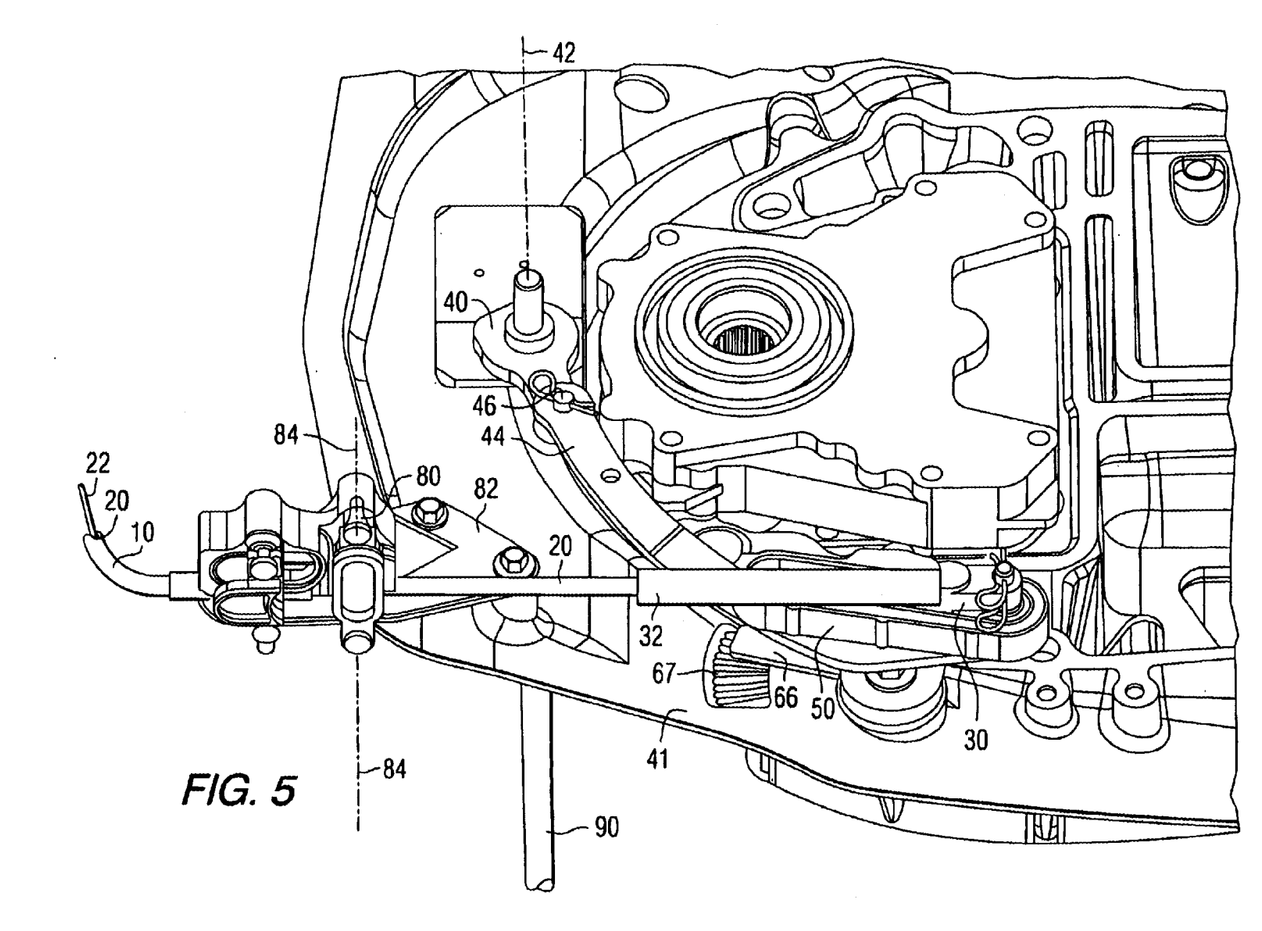
FIGS. 5 and 6 are isometric and planer views of a preferred embodiment of the present invention.
Figure 6:
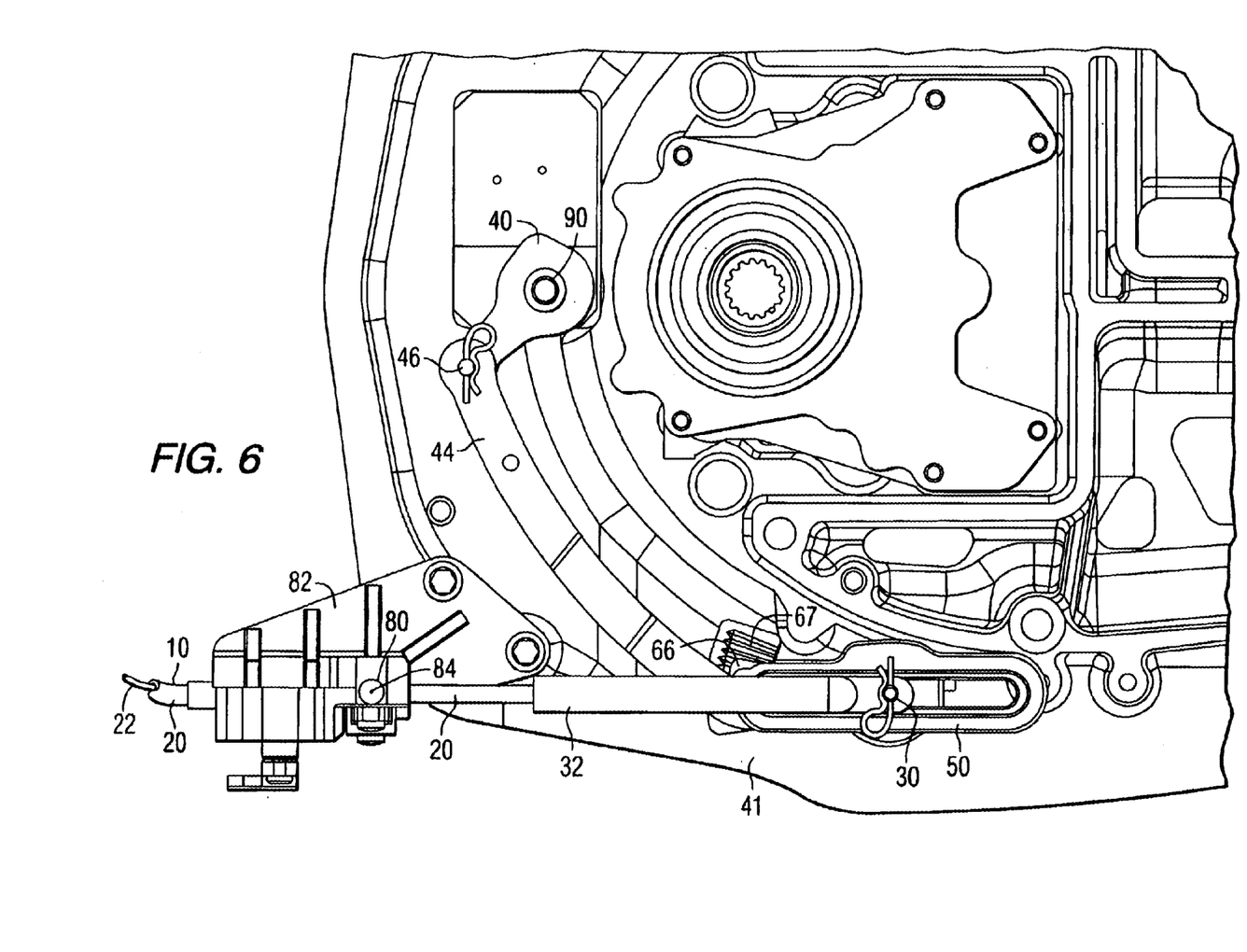

FIGS. 5 and 6 are isometric and planer representations of the present invention in conjunction with a shift shaft of a marine vessel. For purposes of illustration, a portion of the marine propulsion system is removed to expose the components of the present invention. In FIGS. 5 and 6, the manually controlled gear position selector 92 is not illustrated.

With continued reference to FIGS. 5 and 6, the push-pull cable 10 extends through the anchor member 80 which allows it to rotate about axis 84 in response to movement of the tubular member 32 and actuator 30 relative to the support structure 82 on which the anchor member 80 is attached. The tubular portion 32 extends above the channel portion 54 to place the actuator 30 within the channel portion. The retention portion 60 is illustrated with a threaded member 62 used to clamp it downward to the surface 41 to which it is attached. The extension 66 is rotatable, during the adjustment process, about point 70 to allow its protrusion to pass over a plurality of recesses 67 into which it can be disposed. In a preferred embodiment of the present invention, the extension 66 is provided with one or more downwardly extending protrusions attached to its lower surface and these protrusions can be inserted into one of the recesses 67, depending on the position of the position retention mechanism 60. When this is done, the threaded member 62 is tightened to restrict further movement and to assure that the selected path 56 remains unchanged. As the actuator 30 moves within the channel portion 54, link arm 44 moves because one end of the link arm 44 is attached to the actuator 30 and is also restricted to move along path 56. The movement of the link arm 44, in turn, causes the rotatable component 40 to rotate about axis 42. This rotation of the rotatable component 40 causes the shift shaft to rotate and move into one of the three potential gear selection positions. The actuator 30 is movable within the channel portion 54 to either the forward F, neutral N, or reverse R positions. This movement, in turn, moves the link arm 44 and the rotatable component 40 into its corresponding forward, neutral, and reverse positions. A typical procedure for aligning the gear selection positions, in association with the present invention, comprises the step of moving the manually movable gear selector 94 into a forward gear selecting position. If the shift shaft is not moved into its appropriate forward gear position, the threaded member 62 is loosened and the protrusions on extensions 66 are removed from their associated recesses 67 on surface 41. Then, the motion directing component 50 is rotated about axis 70 until the rotatable component 40 places the attached shift shaft into the proper forward gear selecting position. When this is done, the protrusions on extension 66 are placed in their most proximate associated recesses 67 in surface 41 and the threaded member 62 is tightened to restrict further movement. This process could, alternatively, begin by placing the manually controlled gear selector handle 94 in reverse position and loosening the motion directing component 50 to allow the shift shaft to be moved into its appropriate reverse gear selecting position before retightening the threaded member 62. The precise order of adjusting the motion directing component 50 is not limiting to the present invention. The important function provided by the present invention is that it allows the actuation system to be adjusted without having to change the installation of the push-pull cable 10. Adjustment of the motion directing component 50 allows the system to be slightly repositioned or modified to suit the characteristics of the push-pull cable after it is installed in a marine vessel.

Although the present invention has been described in particular detail and illustrated to show a preferred embodiment, it should be understood that alternative embodiments are also within its scope.

I claim:

1. An actuation system, comprising:
   a push-pull cable having a control end and an actuation end, said push-pull cable comprising a sheath and a wire disposed within said sheath;
   an actuator attached to said wire at said actuation end;
   a rotatable component supported for rotation about a first axis;
   a link arm connected between said rotatable component and said actuator, said link arm being attached to said rotatable component at a point which is spaced apart from said first axis;
   a motion directing component associated with said actuator to determine the path of travel of said actuator in response to movement of said wire at said actuation end of said push-pull cable, the position of said motion directing component being adjustable about an adjustment axis which is generally parallel to said first axis.

2. The actuation system of claim 1, further comprising:
   an anchor member attached to said actuation end of said sheath.

3. The actuation system of claim 2, wherein:
   said anchor member is rotatable about a second axis.

4. The actuation system of claim 1, wherein:
   said motion directing component comprises a channel portion, said actuator being disposed within said channel portion, said channel portion limiting said actuator to a restricted path in response to movement of said wire relative to said sheath at said actuation end of said push-pull cable.

5. The actuation system of claims 4, wherein:
   said restricted path is generally a straight line.

6. The actuation system of claim 1, further comprising:
   a position retention mechanism to prevent movement of said motion directing component relative to said rotatable component except when said the position of said motion directing component is being manually adjusted.

7. The actuation system of claim 6, wherein:
   said position retention mechanism comprises a protrusion on said position retention mechanism and a recess formed in a surface to which said position retention mechanism is attached.

8. The actuation system of claim 1, wherein:
   said rotatable component is attached to a shift shaft of a marine propulsion system, whereby rotation of said rotatable component causes synchronous rotation of said shift shaft.

9. The actuation system of claim 1, further comprising:
   a manually controlled gear position selector connected to said control end of said push-pull cable, whereby movement of said manually controlled gear position selector causes said wire to move within said sheath.

10. An actuation device for a marine propulsion system, comprising:
    a push-pull cable having a control end connected to a manually controlled gear selector and an actuation end connected to said marine propulsion system, said push-pull cable comprising a sheath and a wire disposed within said sheath;
    an actuator attached to said wire at said actuation end of said push-pull cable;
    an anchor member attached to said sheath at said actuation end of said push-pull cable;
    a rotatable component supported by said marine propulsion system for rotation about a first axis;
    a link arm connected between said rotatable component and said actuator, said link arm being attached to said rotatable component at a point which is spaced apart from said first axis;
    a motion directing component slidably associated with said actuator to determine the path of travel of said actuator in response to movement of said wire at said actuation end of said push-pull cable, the position of said motion directing component being adjustable about an adjustment axis which is generally parallel to said first axis and relative to said marine propulsion system.

11. The actuation system of claim 10, wherein:
    said anchor member is rotatable about a second axis.

12. The actuation system of claim 11, wherein:
    said motion directing component comprises a channel portion, said actuator being disposed within said channel portion, said channel portion limiting said actuator to a restricted path in response to movement of said wire relative to said sheath at said actuation end of said push-pull cable.

13. The actuation system of claim 12, wherein:
    said restricted path is generally a straight line.

14. The actuation system of claim 13, further comprising:
    a position retention mechanism to prevent movement of said motion directing component relative to said rotatable component except when said the position of said motion directing component is being manually adjusted.

15. The actuation system of claim 14, wherein:
    said position retention mechanism comprises a protrusion on said position retention mechanism and a recess formed in a surface to which said position retention mechanism is attached.

16. The actuation system of claim 15, wherein:
    said rotatable component is attached to a shift shaft of a marine propulsion system, whereby rotation of said rotatable component causes synchronous rotation of said shift shaft.

17. A gear selector device for a marine propulsion system, comprising:
    a push-pull cable having a control end connected to a manually controlled gear selector and an actuation end connected to said marine propulsion system, said push-pull cable comprising a sheath and a wire disposed within said sheath;
    an actuator attached to said wire at said actuation end of said push-pull cable;
    an anchor member attached to said sheath at said actuation end of said push-pull cable, said anchor member being rotatable about a second axis;
    a rotatable component supported by said marine propulsion system for rotation about a first axis;
    a link arm connected between said rotatable component and said actuator, said link arm being attached to said rotatable component at a point which is spaced apart from said first axis;
    a motion directing component slidably associated with said actuator to determine the path of travel of said actuator in response to movement of said wire at said actuation end of said push-pull cable, the position of said motion directing component being rotatable about an adjustment axis which is generally parallel to said first axis and relative to said marine propulsion system.

18. The actuation system of claim 17, wherein:

said motion directing component comprises a channel portion, said actuator being disposed within said channel portion, said channel portion limiting said actuator to a restricted path in response to movement of said wire relative to said sheath at said actuation end of said push-pull cable, said rotatable component being attached to a shift shaft of a marine propulsion system, whereby rotation of said rotatable component causes synchronous rotation of said shift shaft.

19. The actuation system of claim 18, further comprising:

a position retention mechanism to prevent movement of said motion directing component relative to said rotatable component except when said the position of said motion directing component is being manually adjusted.

20. The actuation system of claim 19, wherein:

said position retention mechanism comprises a protrusion on said position retention mechanism and a recess formed in a surface to which said position retention mechanism is attached.

\* \* \* \* \*